United States Patent [19]

von der Haegen et al.

[11] Patent Number: 5,198,477

[45] Date of Patent: Mar. 30, 1993

[54] CONTACT LENSES MADE FROM THERMOFORMABLE MATERIAL

[75] Inventors: Harro M. von der Haegen, Laufach; Bernhard Seiferling, Goldbach, both of Fed. Rep. of Germany

[73] Assignee: Ciba-Geigy Corporation, Ardsley, N.Y.

[21] Appl. No.: 841,920

[22] Filed: Feb. 25, 1992

[30] Foreign Application Priority Data

Feb. 28, 1991 [CH] Switzerland .............................. 604/91

[51] Int. Cl.$^5$ .......................... C08L 23/00; C08F 38/02
[52] U.S. Cl. ..................................... 523/106; 523/107; 523/108; 526/285; 526/308
[58] Field of Search ....................... 523/106, 107, 108; 526/285, 308

[56] References Cited

U.S. PATENT DOCUMENTS 4,866,148 9/1989 Geyer et al. ......................... 523/106

OTHER PUBLICATIONS

Draxler, A; The Position of Polyoctenamers Among Industrially Used Rubbers, Dec. 1983, pp. 1037–1043.

Draxler, A; A New Rubber: Trans-Polyoctenamer; Feb. 1983; pp. 16–20.

Vestenamer-An unusual Rubber with Versatile Possibilities, Oct. 1991, 2nd Edition.

Primary Examiner—Paul R. Michl
Assistant Examiner—LaVonda R. DeWitt
Attorney, Agent, or Firm—Edward McC. Roberts; William G. Hervey

[57] ABSTRACT

The invention relates to contact lenses made from a polymer comprising macrocycles that are made up of units of formula I $$-(-CR^1=CR^2-A-)-\qquad(I)$$

wherein A is alkylene or alkenylene each having from 3 to 10 carbon atoms and each of which may be substituted by one or more $R^3$ radicals, each of $R^1$ and $R^2$, independently of the other, is hydrogen or lower alkyl, and $R^3$ is lower alkyl, fluorinated lower alkyl or a siloxane radical.

They exhibit a combination of a high degree of hardness and oxygen permeability. They can be produced in an especially advantageous manner, that is to say by hot compression moulding.

14 Claims, No Drawings

CONTACT LENSES MADE FROM THERMOFORMABLE MATERIAL

The present invention relates to novel contact lenses made from a material that can be processed by hot compression moulding, to the use of that material for the manufacture of contact lenses and to the processes used for the manufacture of those contact lenses.

The contact lenses according to the invention are not water-containing. They exhibit a high degree of strength and, in addition, a suprisingly high oxygen permeability. The Dk values are up to above 100 (Fatt units). The materials on which the contact lenses are based are low in cost and, furthermore, the manufacture of the contact lenses is carried out in a very efficient manner.

The chosen method of manufacture is the so-called hot compression moulding or thermoforming method, which can be used only with thermoplastic materials. Hitherto, mainly cellulose acetate butyrate (CAB) and polymethyl methacrylate (PMMA) have been suitable for such a method where contact lenses are concerned. With those starting materials, however, it is not possible to obtain contact lenses with comparably high oxygen permeabilities.

The contact lenses according to the invention consequently offer advantages over the prior art in various areas: for example, the finished lenses exhibit decidedly favourable material properties, the costs of the starting materials are low, and little expenditure on apparatus is required for the manufacture of the contact lenses.

These and other advantages can be achieved with the contact lenses according to the invention, which comprise as the essential constituent polycycloalkenylenes, especially poly(1-octene-1,8-diyl).

The invention therefore relates to contact lenses made from a polymer comprising macrocycles that are made up of units of formula I

$$-(-CR^1=CR^2-A-)- \quad (I)$$

wherein A is alkylene or alkenylene each having from 3 to 10 carbon atoms and each of which may be substituted by one or more $R^3$ radicals, each of $R^1$ and $R^2$, independently of the other, is hydrogen or lower alkyl, and $R^3$ is lower alkyl, fluorinated lower alkyl or a siloxane radical.

Alkylene having from 3 to 10 carbon atoms contains preferably from 5 to 8 carbon atoms, especially 6 or 7 carbon atoms, and is, for example, propylene, pentylene, hexylene, heptylene, octylene or decylene, especially hexylene or heptylene.

Alkenylene having from 3 to 10 carbon atoms contains preferably from 5 to 8 carbon atoms, especially 6 or 7 carbon atoms, and one or more double bonds, especially one double bond. Examples are propenylene, pentenylene, hexenylene, octenylene and decenylene, especially hexenylene and heptenylene.

The number of radicals $R^3$, if present, in one unit of formula I is preferably from one to three, especially one or two.

Lower alkyl has up to 7 carbon atoms, especially up to 4 carbon atoms, and is, for example, methyl, ethyl, propyl, butyl, tert-butyl, pentyl or hexyl, especially methyl.

Fluorinated lower alkyl has up to 7 carbon atoms, especially up to 4 carbon atoms, and is preferably perfluorinated. Examples are perfluorinated methyl, ethyl, propyl, isopropyl, butyl, isobutyl or tert-butyl, especially perfluorinated methyl.

A siloxane radical within the scope of the present invention is a radical bonded by way of silicon with an alternating sequence of silicon and oxygen atoms that has up to 13 silicon atoms, the free valencies of which carry lower alkyl radicals, especially methyl radicals, or phenyl radicals. Examples are trimethylsilyloxy-dimethylsilyl, tris(trimethylsilyloxy)silyl, triphenylsilyloxy-dimethylsilyl and triphenylsilyloxy-diphenylsilyl.

The term "macrocycles" in connection with this invention does not indicate that exclusively macrocyclic structures are present in the described polymers. "Macrocycles" is rather used to denote polymers that can be obtained by the metathesis of cycloolefins. Polymers obtainable in that manner are known to be different in their structure and properties from polymers produced from linear olefins.

The macrocycles are preferably made up of up to 300 units of formula I, preferably up to 200 units of formula I. It is also possible to use mixtures of macrocycles made up of different numbers of units of formula I. If mixtures are used, preferably at least 90% by weight of the macrocycles contain up to 200 units of formula I. Preferably, the macrocycles contain approximately from 100 to 200 units of formula I.

Preferred are contact lenses made from a polymer comprising macrocycles of units of formula I wherein A is alkylene, or alkylene having from 3 to 10 carbon atoms that is substituted by from one to three $R^3$ radicals, each of $R^1$ and $R^2$, independently of the other, is hydrogen or lower alkyl, and $R^3$ is lower alkyl, fluorinated lower alkyl or a siloxane radical.

Also preferred are contact lenses made from a polymer comprising macrocycles of units of formula I wherein A is alkylene having from 5 to 8 carbon atoms which may be substituted by from one to three $R^3$ radicals, each of $R^1$ and $R^2$, independently of the other, is hydrogen or lower alkyl, and $R^3$ is lower alkyl.

Especially preferred are contact lenses made from a polymer comprising macrocycles of units of formula I wherein A is alkylene having from 5 to 8 carbon atoms which may be substituted by one or two $R^3$ radicals, $R^1$ and $R^2$ are each hydrogen and $R^3$ is lower alkyl.

Most especially preferred are contact lenses made from a polymer comprising macrocycles of units of formula I wherein A is alkylene having from 5 to 8 carbon atoms, and $R^1$ and $R^2$ are each hydrogen. Of these there are especially preferred those wherein A is alkylene having 6 carbon atoms.

A special embodiment of the invention therefore relates to contact lenses made from a polymer comprising macrocycles that are made up of units of formula I wherein A is alkylene or alkenylene each having from 3 to 10 carbon atoms and each of which may be substituted by one or more $R^3$ radicals, each of $R^1$ and $R^2$, independently of the other, is hydrogen or lower alkyl, and $R^3$ is lower alkyl, fluorinated lower alkyl or a siloxane radical.

In addition to the macrocycles which are made up of units of formula I, however, the polymers of which the contact lenses according to the invention consist may also comprise other constituents. The proportion of those other constituents is suitably 50 percent by weight or below, especially 25 percent by weight or below, more especially approximately 5 percent by weight, but it can also be 1 percent by weight or below. The other constituents are especially crosslinking agents or other additives.

Customary crosslinking agents are crosslinking initiators, for example peroxides, azo compounds or sulfur, or oligovinyl compounds, the latter especially for crosslinking the other additives already mentioned.

Typical examples of the peroxy compounds that can be used are isopropyl percarbonate, tert-butyl peroctoate, benzoyl peroxide, lauroyl peroxide, decanoyl peroxide, acetyl peroxide, dicumyl peroxide, succinic acid peroxide, methyl ethyl ketone peroxide, tert-butyl peroxyacetate, propionyl peroxide, 2,4-dichlorobenzoyl peroxide, tert-butyl peroxypivalate, pelargonyl peroxide, 2,5-dimethyl-2,5-bis(2-ethylhexanoylperoxy)hexane, p-chlorobenzoyl peroxide, tert-butyl peroxybutyrate, tert-butyl per-2-ethylhexanoate, tert-butyl peroxymaleic acid, tert-butyl peroxyisopropylcarbonate, bis(4-tert-butylcyclohexyl)peroxydicarbonate and bis-(1-hydroxycyclohexyl)peroxide.

Azo compounds include 2,2'-azo-bis-isobutyronitrile, 2,2'-dimethylvaleronitrile), 1,1'-azo-bis(cyclohexanecarbonitrile) and 2,2'-azo-bis(2,4-dimethyl-4-methoxyvaleronitrile).

Suitable initiators are, further, photoinitiators, benzoin ethers, Darocure types (Merck) or Irgacure types (CIBA-GEIGY).

The crosslinking can also be effected using other mechanisms that form free radicals, such as high-energy radiation with, for example, X-rays or electron beams, or UV radiation.

Another special embodiment of the invention therefore relates to contact lenses made from a polymer comprising crosslinked macrocycles that are made up of units of formula I wherein A is alkylene or alkenylene each having from 3 to 10 carbon atoms and each of which may be substituted by one or more $R^3$ radicals, each of $R^1$ and $R^2$, independently of the other, is hydrogen or lower alkyl, and $R^3$ is lower alkyl, fluorinated lower alkyl or a siloxane radical.

Another special embodiment of the invention relates also to contact lenses made from a polymer consisting of crosslinked macrocycles that are made up of units of formula I wherein A, $R^1$ and $R^2$ have the meanings given hereinbefore.

The already mentioned so-called other additives are polymers or copolymers that are customarily used for contact lenses. They may be added in small amounts to the macrocycles made up of units of formula I, suitably in amounts of up to 20 percent by weight, advantageously in amounts of up to 5 percent by weight, especially also in amounts of from 0.1 to 1 percent by weight. These additives are not usually polymerised into the macrocycles, or at any rate not to any appreciable extent, but form, for example, homopolymers or block polymers that with the macrocycles produce an interpenetrating network.

Suitable compatible additives are, for example, hydrophobic compounds, such as hydrocarbons having a polymerisable olefinic group, e.g. styrene, such hydrocarbons that are substituted by lower alkyl and/or by fluorine, such as correspondingly substituted styrenes, or lower alkenecarboxylic acid esters, e.g. lower alkylacrylates and methacrylates, fluorinated lower alkyl acrylates and methacrylates or siloxane acrylates and methacrylates, but in addition also polymers such as cellulose acetate butyrate (CAB). Also suitable as additives, however, are hydrophilic compounds, such as N-vinylpolymerisable heterocycles, e.g. N-vinylpyrrolidone (VP), or poly-N-vinylpyrrolidone (PVP), or lower alkenecarboxylic acid esters having a polar functional group, such as hydroxy or amino, e.g. hydroxyethyl (meth)acrylate or N-tert-butylaminoethyl (meth)acrylate. It may be advantageous, especially when monomers having a polymerisable vinyl group are used, to use in addition as crosslinking agent an oligovinyl compound customarily used for contact lenses, such as ethylene glycol dimethyl acrylate or triallyl cyanurate.

Another special embodiment of the invention therefore relates to contact lenses made from a polymer comprising crosslinked macrocycles that are made up of units of formula I wherein A is alkylene or alkenylene each having from 3 to 10 carbon atoms and each of which may be substituted by one or more $R^3$ radicals, each of $R^1$ and $R^2$, independently of the other, is hydrogen or lower alkyl and $R^3$ is lower alkyl, fluorinated lower alkyl or a siloxane radical, and up to 20 percent by weight of compatible additives as described above. Preferred additives are CAB, VP or PVP.

Another special embodiment of the invention therefore relates to contact lenses made from a polymer consisting of crosslinked macrocycles that are made up of units of formula I wherein A, $R^1$ and $R^2$ have the meanings given above, and up to 20 percent by weight of compatible additives as described above. Preferred additives are CAB, VP or PVP.

The invention relates also to the use of the macrocycles made up of units of formula I, especially in crosslinked form, for the manufacture of contact lenses. This includes the use of a single type of macrocycle, which results in homopolymers, and to the use of different kinds of macrocycles, which results in interpolymers. In addition, this also includes the use of macrocycles together with suitable compatible additives, as described above.

Macrocycles made up of units of formula I are of a known type and can be produced in a manner known per se by metathesis, e.g. as in Houben-Weyl, Volume E 20 II, pages 918 ff. The basic monocycles are used as starting materials. For example poly(1-octene-1,8-diyl), the use of which is especially preferred according to the invention, can be produced from cyclooctene. That particular macrocycle is also available commercially, e.g. as Vestenamer ® 6213 (Hüls). Other macrocycles can be produced in an analogous manner. The other constituents of the contact lenses according to the invention are also known compounds.

The contact lenses according to the invention can be manufactured in a manner known per se by moulding macrocycles made up of units of formula I, alone or together with the described other constituents, but preferably together with at least a crosslinking agent, by hot compression moulding using suitable dies, to form contact lenses.

A particular feature of the process of the invention is that the crosslinking can be carried out during the hot compression moulding. In the course of this the material changes from thermoplast to thermodur. The crosslinking can also be triggered by the hot compression moulding and still continue subsequent thereto, or it can take place after the hot compression moulding.

Suitably, the macrocycles and the other constituents possibly used for the hot compression moulding are prepared by casting sheets from them or by carefully processing the constituents in kneaders. Sheets may be cast, e.g., from dilute solutions in inert solvents, such as halogenated hydrocarbons, e.g. dichloromethane, or ethers, e.g. tetrahydrofuran. This is followed by careful drying, during which the solvent evaporates. At least 10 hours' drying at room temperature, or from 1 to 3 hours at room temperature followed by from 1 to 5 hours at 50° to 80° C., is, for example, suitable. Alternatively, the constituents may be mixed in customary commercial kneaders at temperatures above 30° C. but below the scorch temperature (the maximum processing temperature at which the crosslinking agent used does not suffer any substantial loss in activity). The operation is suitably carried out under reduced pressure to avoid the formation of air bubbles.

The conditions under which the hot compression moulding is carried out are within wide limits not critical within the scope of the parameters familiar to the person skilled in the art. Suitable pressures are in the range of from 5 to 20 bar, the temperature, for example 50° to 180° C., is adjusted to the crosslinking initiator used, and the time required is normally in the region of a few minutes, for example up to 10 minutes. If necessary, customary commercial release agents may be used for releasing the contact lens from the compression moulding tool.

The following Examples are to explain the subject of the invention in detail without, however, limiting it in any way, for example to the scope of the Examples. In the Examples, temperatures are in degrees Celsius. Contents are always in percent by weight.

The oxygen permeability is determined on plane-parallel plates according to Fatt. In the respective Tables with physical data, the thickness of the measured plates is given after the Dk-value under the heading "d". The tear strength and elongation at tear are determined using a Universal testing machine Type 144501 (Zwick). The drawing speed is 500 mm per minute. The test bodies used are plane-parallel pieces of sheet 4 mm wide with a length for measurement of 5 mm.

The following abbreviations are used in the Examples for chemical compounds:

| | |
|---|---|
| BCHPC | bis(4-tert-butylcyclohexyl)peroxydicarbonate |
| CAB | cellulose acetate butyrate |
| DCP | dicumyl peroxide |
| PVP | poly-N-vinylpyrrolidone |
| TAC | triallyl cyanurate |
| TBPEH | tert-butylper-2-ethylhexanoate |
| VP | vinylpyrrolidone |

The content of crosslinking agent and other additives is in each case based on poly(1-octene-1,8-diyl).

EXAMPLE 1

4% tert-butylper-2-ethylhexanoate is added to a 10% solution of poly(1-octene-1,8-diyl) (trade name Vestenamer ® 6213) in dichloromethane. A sheet is cast from the solution on a glass plate. The dichloromethane is evaporated by drying for three hours at room temperature and for three hours at 70° C. Contact lenses are compression moulded from the dried sheet at 130° C. and a pressure of 5 to 20 bar for 5 minutes using suitable dies. The contact lenses so obtained have an oxygen permeability (Dk) of 79, a tear strength of 2.6 MPa and an elongation at tear of 920%.

EXAMPLES 2 TO 10

Mouldings based on poly(1-octene-1,8-diyl) (trade name Vestenamer ® 6213) are produced in an analogous manner. They contain the proportions of crosslinking agent and other additives shown below, the respective compression moulding temperature also being indicated. The PVP used in Example 7 has a molecular weight of 25000. A special procedure is used in Example 10: VP and TAC and 0.5% azoisobutyronitrile (based on VP/TAC) are added to the solution of poly(1-octene-1,8-diyl), oxygen is removed, and the mixture is heated in several steps to 80° C. and maintained at that temperature for 2 hours. TBPEH is then added and the sheet is cast in the manner described.

| | Crosslinking agent | | | Additive | |
|---|---|---|---|---|---|
| Number | Type | Content % | °C. 1) | Type | Content % |
| 2 | TBPEH | 10 | 130 | — | — |
| 3 | TBPEH | 20 | 130 | — | — |
| 4 | DCP | 3 | 130 | — | — |
| 5 | BCHCP | 5 | 90 | — | — |
| 6 | TBPEH | 20 | 130 | CAB | 1 |
| 7 | DCP | 0.5 | 130 | PVP | 0.1 |
| 8 | DCP | 0.5 | 130 | CAB | 5 |
| 9 | DCP | 0.5 | 130 | TAC | 0.5 |
| 10 | TBPEH | 5 | 90 | VP/TAC | 15/5 |

1) Compression moulding temperature

PHYSICAL DATA OF THE MOULDINGS OF EXAMPLES 1 TO 10

| | $O_2$-permeability | | Refractive index $n_D^{20}$ | Tear strength MPa | Elongation at tear % |
|---|---|---|---|---|---|
| Number | DK | d (mm) | | | |
| 1 | 79 | 0.09 | — | 2.6 | 920 |
| 2 | 84 | 0.16 | — | 3.2 | 690 |
| 3 | 57 | 0.11 | — | 2.1 | 230 |
| 4 | 53 | 0.19 | 1.497 | 2.0 | 130 |
| 5 | — | — | — | 3.9 | 1670 |
| 6 | 65 | 0.16 | — | 3.3 | 730 |
| 7 | 59 | 0.19 | 1.497 | 1.9 | 2030 |
| 8 | 22 | 0.16 | 1.500 | 10.0 | 20 |
| 9 | 74 | 0.31 | 1.497 | 2.6 | 1790 |
| 10 | 75 | 0.22 | — | 3.7 | 1480 |

EXAMPLE 11

5% tert-butylper-2-ethylhexanoate is added to poly(1-octene-1,8-diyl) (trade name Vestenamer ® 6213) and the crosslinking agent is incorporated in a customary commercial kneader under reduced pressure at a temperature of 35° C. Contact lenses are compression moulded from the resulting mass at 160° C. and a pressure of 5 to 20 bar for a period of 5 minutes using suitable dies. The contact lenses so obtained have an oxygen permeability (Dk) of 106 and a tear strength of 2.7 MPa.

EXAMPLES 12 TO 15

Further mouldings based on poly(1-octene-1,8-diyl) (trade name Vestenamer ® 6213) are produced in an analogous manner. They contain the following amounts of crosslinking agent; the respective compression moulding temperature is also given:

| | Crosslinking agent | | Compression moulding temp. °C. |
|---|---|---|---|
| Number | Type | Content % | |
| 12 | TBPEH | 2 | 160 |
| 13 | TBPEH | 1 | 160 |
| 14 | BCHPC | 5 | 90 |

-continued

| Number | Crosslinking agent Type | Content % | Compression moulding temp. °C. |
|---|---|---|---|
| 15 | BCHPC | 2 | 90 |

PHYSICAL DATA OF THE MOULDINGS OF EXAMPLES 11 TO 15

| Number | $O_2$-permeability Dk | d (mm) | Refractive index $n_D^{20}$ | Tear strength MPa | Elongation at tear % |
|---|---|---|---|---|---|
| 11 | 106 | 0.3 | — | 2.7 | — |
| 12 | 98 | 0.3 | — | 3.2 | 1990 |
| 13 | 95 | 0.3 | — | 1.6 | 1547 |
| 14 | 82 | 0.29 | — | 3.0 | 1920 |
| 15 | 99 | 0.30 | — | 1.7 | 2000 |

What is claimed is:

1. A contact lens made from a polymer comprising macrocycles that are made up of units of formula I $$-(-CR^1=CR^2-A-)-\qquad (I)$$

wherein A is alkylene or alkenylene each having from 3 to 10 carbon atoms and each of which may be substituted by one or more $R^3$ radicals, each of $R^1$ and $R^2$, independently of the other, is hydrogen or lower alkyl, and $R^3$ is lower alkyl, fluorinated lower alkyl or a siloxane radical.

2. A contact lens according to claim 1, wherein the macrocycles are crosslinked.

3. A contact lens according to either claim 1 or claim 2, wherein A is alkylene having from 3 to 10 carbon atoms which may be substituted by from one to three $R^3$ radicals, each of $R^1$ and $R^2$, independently of the other, is hydrogen or lower alkyl, and $R^3$ is lower alkyl, fluorinated lower alkyl or a siloxane radical.

4. A contact lens according to either claim 1 or claim 2, wherein A is alkylene having from 5 to 8 carbon atoms which may be substituted by from one to three $R^3$ radicals, each of $R^1$ and $R^2$, independently of the other, is hydrogen or lower alkyl, and $R^3$ is lower alkyl.

5. A contact lens according to either claim 1 or claim 2, wherein A is alkylene having from 5 to 8 carbon atoms which may be substituted by one or two $R^3$ radicals, $R^1$ and $R^2$ are each hydrogen, and $R^3$ is lower alkyl.

6. A contact lens according to either claim 1 or claim 2, wherein A is alkylene having from 5 to 8 carbon atoms, and $R^1$ and $R^2$ are each hydrogen.

7. A contact lens according to either claim 1 or claim 2, wherein A is alkylene having 6 carbon atoms and $R^1$ and $R^2$ are each hydrogen.

8. A contact lens according to either claim 1 or claim 2 that is made from a polymer consisting of macrocycles that are made up of units of formula I wherein A is alkylene or alkenylene each having from 3 to 10 carbon atoms and each of which may be substituted by one or more $R^3$ radicals, each of $R^1$ and $R^2$, independently of the other, is hydrogen or lower alkyl, and $R^3$ is lower alkyl, fluorinated lower alkyl or a siloxane radical.

9. A contact lens according to claim 8, wherein A is alkylene having 6 carbon atoms and $R^1$ and $R^2$ are each hydrogen.

10. A contact lens according to either claim 1 or claim 2 that is made from a polymer comprising crosslinked macrocycles that are made up of units of formula I wherein A is alkylene or alkenylene each having from 3 to 10 carbon atoms and each of which may be substituted by one or more $R^3$ radicals, each of $R^1$ and $R^2$, independently of the other, is hydrogen or lower alkyl, and $R^3$ is lower alkyl, fluorinated lower alkyl or a siloxane radical, and up to 20 percent by weight of compatible additives, such as crosslinking agents and customary contact lens materials.

11. A contact lens according to claim 10, wherein the customary contact lens materials are selected from hydrophobic compounds, such as hydrocarbons having a polymerisable olefinic group, such hydrocarbons that are substituted by lower alkyl and/or by fluorine, lower alkenecarboxylic acid esters, for example lower alkyl acrylates and methacrylates, fluorinated lower alkyl acrylates and methacrylates, siloxane acrylates and methacrylates, but in addition also polymers, such as cellulose acetate butyrate (CAB), and hydrophilic compounds, such as N-vinyl-polymerisable heterocycles, and lower alkenecarboxylic acid esters having a polar functional group, such as hydroxy or amino.

12. A contact lens according to claim 10, wherein the customary contact lens materials are selected from cellulose acetate butyrate, N-vinylpyrrolidone and poly-N-vinylpyrrolidone.

13. The use of macrocycles that are made up of units of formula I according to claim 1, especially in crosslinked form, for the manufacture of contact lenses.

14. A method of producing a contact lens as claimed in claim 1, wherein macrocycles made up of units of formula I are moulded, alone or together with the described other constituents, but preferably together at least with a crosslinking agent, by hot compression moulding using suitable dies, to form contact lenses. n

* * * * *